United States Patent [19]

James et al.

[11] Patent Number: 5,052,029
[45] Date of Patent: Sep. 24, 1991

[54] SELF-CORRECTING SYNCHRONIZATION SIGNAL METHOD AND APPARATUS

[75] Inventors: David V. James, Palo Alto; Michael D. Teener, Santa Cruz, both of Calif.

[73] Assignee: Apple Computer, Inc., Cupertino, Calif.

[21] Appl. No.: 505,334

[22] Filed: Apr. 5, 1990

[51] Int. Cl.$^5$ .............................................. H04L 7/06
[52] U.S. Cl. .................................. 375/107; 375/111; 455/51; 370/94.1
[58] Field of Search ................. 375/107, 111; 455/51, 455/57; 370/94.1, 105.1; 340/825.14, 825.2

[56] References Cited

U.S. PATENT DOCUMENTS 4,411,007 10/1983 Rodman et al. .................. 455/51 X Primary Examiner—Benedict V. Safourek
Assistant Examiner—Tesfaldet Bocure
Attorney, Agent, or Firm—Mark Aaker

[57] ABSTRACT

A self-correcting synchronization signal for a communication interconnect which connects multiple units, the synchronization method including the steps of: waiting for a predetermined period of time until the next synchronization signal is due (nominal cycle period); waiting a further period of time for the absence of communications on the interconnect among any of the units, and forming a count of the passage of time during this delay (start delay); forming a synchronization signal including the count of the delay time; and sending the synchronization signal on the interconnect. Also according to this invention, a unit receiving the synchronization signal on the interconnect can update its count of time by the predetermined period of time plus the count of the delay period of time. Also according to this invention, some units can be assigned sequential access numbers, and upon recieving the synchronization signal, units without an assigned access number refrain from using the interconnect until after all units with an assigned access number have sequentially used the interconnect. This provides at last one clear opportunity for each of the units with assigned access numbers to access the interconnect in the period between synchronization signals before the interconnect is available for general access by all units. An apparatus for providing the self-correcting synchronization signal in accordance with this invention includes a cycle master unit for generating cycle start signals and transmitting them on the interconnect, and a receiving unit for receiving cycle sync signals from the interconnect and extracting the timing information to generate a local cycle synch signal.

8 Claims, 2 Drawing Sheets

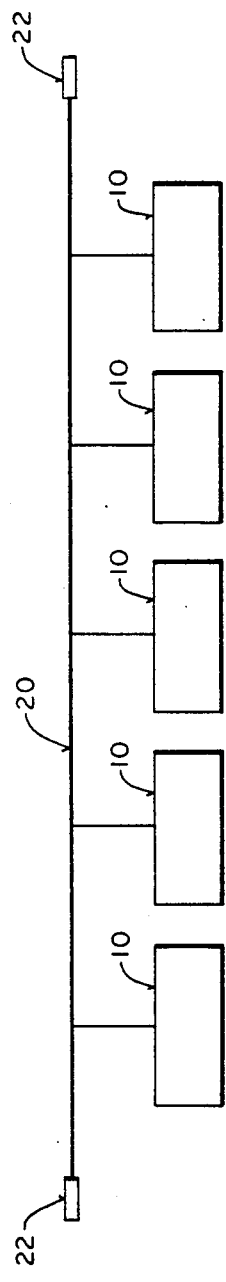
FIG_1
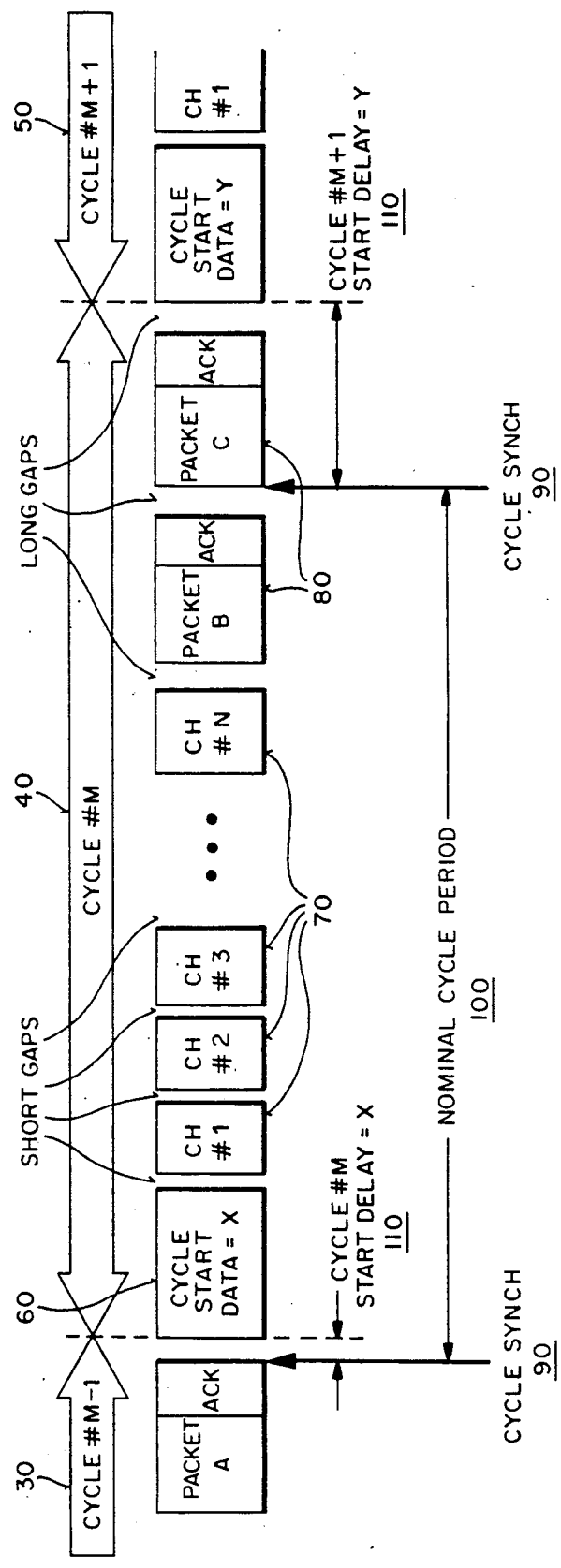
FIG_2

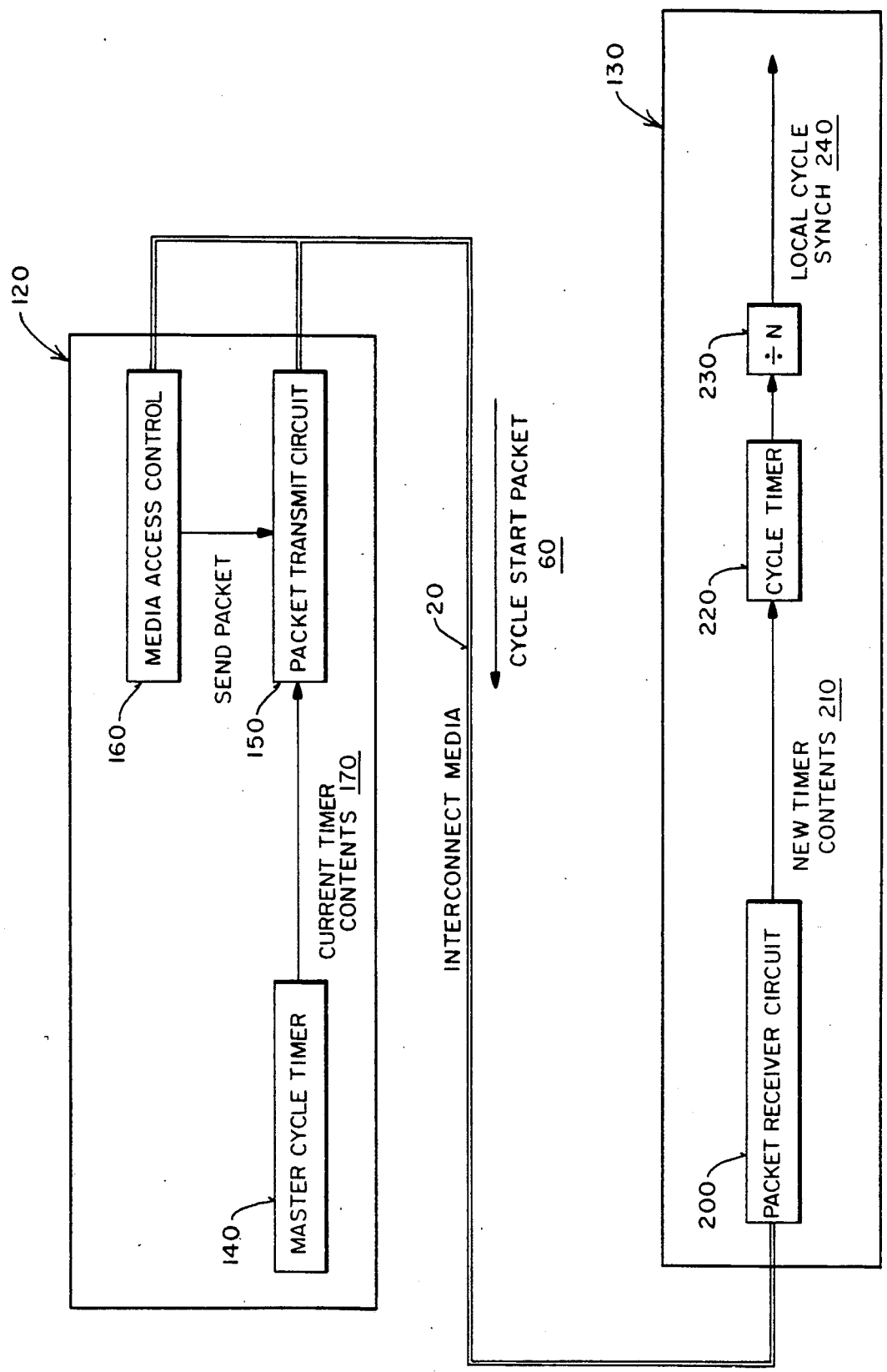

SELF-CORRECTING SYNCHRONIZATION SIGNAL METHOD AND APPARATUS

BACKGROUND OF THE INVENTION

This invention relates to a synchronization signal and its use in a method of access to a communication interconnect that connects multiple units.

Communication systems often need a precisely timed synchronization pulse or signal, but if there is not a separate path for this purpose, then other signals on the interconnect can interfere with the synchronization signal. In the time period between synchronization signals, it is desirable to guarantee that certain units receive at least one clear opportunity to access the interconnect. For the rest of the time, it is desirable to allow units to attempt access to the interconnect at any time as the demand arises.

In existing interconnects, synchronization signals might be carried on a dedicated channel or connection so there is no interference. However, this requires additional physical media or channel allocation. When carried on the same channel as other signals, the synchronization signal might be encoded to protect it from interference. For example, one known synchronization method requires that the data have a structure that repeats at fixed intervals with an embedded synchronization signal. This does not work well with the unstructured data often found in computer systems. Yet other systems allow the synchronization signal to arrive at irregular intervals that can be averaged over a long period of time to derive a more stable average timing. This requires averaging circuitry or software and may take a long time to generate a stable signal. Known access methods either allow all units to attempt access to the interconnect at any time, without guaranteeing access to any; or they allocate every unit equal access to the interconnect and do not provide the flexibility to provide more accesses to those units having more data to send, while the other units are primarily idle. These and other disadvantages are overcome by the synchronization signal method and apparatus of this invention.

This invention does not require a separate dedicated synchronization channel or path, is readily adaptable to unstructured data, and can provide highly accurate synchronization through self-correction of the timing of the synchronization signal. This synchronization signal also initiates a period of time of sequentially assigned access to the interconnect, before returning to a demand-driven access method.

SUMMARY OF THE INVENTION

This invention provides a self-correcting synchronization signal for a communication interconnect which connects multiple units, the synchronization method comprising the steps of:

waiting for a predetermined period of time until the next synchronization signal is due (nominal cycle period);

waiting a further period of time for the absence of communications on the interconnect among any of the units, and forming a count of the passage of time during this delay (start delay);

forming a synchronization signal including the count of the delay time; and sending the synchronization signal on the interconnect.

Also according to this invention, a unit receiving the synchronization signal on the interconnect can update its count of time by the predetermined period of time plus the count of the delay period of time.

Also according to this invention, some units can be assigned sequential access numbers, and upon receiving the synchronization signal, units without an assigned access number refrain from using the interconnect until after all units with an assigned access number have sequentially used the interconnect. This provides at least one clear opportunity for each of the units with assigned access numbers to access the interconnect in the period between synchronization signals before the interconnect is available for general access by all units. And any of the units can use the interconnect until the next synchronization signal.

An apparatus for providing the self-correcting synchronization signal in accordance with this invention includes a cycle master unit for generating cycle start signals and transmitting them on the interconnect, and a receiving unit for receiving cycle sync signals from the interconnect and extracting the timing information to generate a local cycle synch signal.

BRIEF DESCRIPTION OF THE DRAWINGS

FIG. 1 shows a diagrammatic representation of a communication interconnect that connects multiple units in accordance with this invention.

FIG. 2 shows a pictorial time-line representation of communications on an interconnect in accordance with this invention.

FIG. 3 shows a schematic representation of an apparatus for communicating a synchronization signal over an communications interconnect in accordance with this invention.

DETAILED DESCRIPTION

FIG. 1 shows a diagrammatic representation of a communication interconnect that connects multiple units in accordance with this invention. As shown in FIG. 1, multiple units 10 are connected by an interconnect 20. The units 10 can be computers, peripheral devices, test equipment, or interfaces to other types of equipmment or communication interconnects. The interconnect 20 can be built upon any of several underlying technologies including printed circuit board trace, wire, coaxial cable, or optical media. In a preferred form, the interconnect 20 is a broadcast bus capable of operation at variable signaling rates. Some forms of interconnect 20 will require terminators 22. The units 10 communicate with each other over interconnect 20 to exchange data or control information. Of course, other types of interconnects can be used with the methods and apparatus of this invention.

FIG. 2 shows a pictorial time-line representation of communications on an interconnect in accordance with this invention. Three sequential cycles of communication are shown; a preceding cycle 30, a current cycle 40, and a following cycle 50.

Within a cycle of communication, as shown for the current cycle 40, are a cycle start communication 60, followed by a number of sequential assigned access communications 70, followed by a number of regular demand-driven transaction communications 80.

A cycle start communication 60, signals the beginning of a cycle of communication and serves to synchronize communications among the units 10 on the interconnect 20. In a preferred form, the cycle start communication 60 is produced by only one selected unit, which is known as the cycle master unit. Thee cycle master unit keeps a central reference count of the passage of time.

Sequential assigned access communications 70, are a series of communications, one or more from each of a number of units that have each been assigned at least one sequential access number. After a cycle start communication 60, each of the units that have been assigned sequential access numbers have an opportunity to send an assigned access communication 70.

Demand-driven transaction communications 80, are the "regular" communications on the interconnect 20 that arise as units 10 need to exchange data or control information. Transaction communications 80 obtain priority to use the interconnect through a defined access method appropriate to the media of the interconnect 20. In a preferred form, the access method is a bit-by-bit arbitration mechanism on a dominant-mode bus.

The various types of communications on the interconnect 20 can be separated by spaces or "gaps," by special termination symbol signals, or by "idle" signals appropriate to the media in use. In a preferred form, characteristic length gaps on the interconnect 20 are used to move the units 10 through various states of operation such as synchronization, sequential assigned access, and transaction communications.

For synchronizing the timing of communications on the interconnect 20, the cycle master unit keeps a central reference count of the passage of time, and forms and sends cycle start communications 60 to provide synchronization to the other units 10. Within the cycle master unit, a master clock and counter forming a timer records the passage of time, and generates a cycle synch point 90 at predetermined intervals of time known as the nominal cycle period 100. As an example, the nominal cycle period 100 could be 125 microseconds, with cycle synch points 90 occurring at a rate of 8 KiloHertz.

At the expiration of a preceding cycle of time 30, at a cycle synch point 90, a cycle master unit operating in a method according to this invention, waits a further period of time called the cycle start delay 110 for the absence of communications on the interconnect 20 among any of the units 10. When the absence of any other communications is detected, a synchronization signal such as cycle start signal 60 is formed that includes a count of the cycle start delay 110. This cycle start signal 60 is sent by the cycle master unit on the interconnect 20. The cycle master unit will have a high priority or arbitration number to insure it will obtain access to the interconnect 20 when it is ready to send the cycle start signal 60. In this way, the cycle start signal 60 is minimally interfered with by any other communications. Note that the delays caused by the completion of other communications will be variable, hence the requirement to carry different cycle start delay 110 values in the cycle start communications 60.

The cycle start communication 60 is the synchronization signal that defines the start of sequential assigned channel communications 70. In a preferred form, it is formatted like other communications, but with a special arbitration number and address. A cycle start communication 60 contains a count of the cycle start delay 110. which is the time period for which the sending of the cycle start communication was delayed. This count could be encoded, for example, as the number of master clock periods that have elapsed since the cycle synch point 90.

The cycle start communication can also contain the count of the passage of time measured by the master clock in the cycle master unit. This count provides a "time stamp" or absolute count of time, as contrasted to the cycle start delay 110 which contains a count measured from the last cycle synch point 90. Clearly other information of general use to units 10 on the interconnect 20 can also be included in cycle start communication 60, such as the number of following sequential assigned channel communications 70.

A unit 10 receiving the cycle start communication 60 can update an internal clock or provide local cycle synchronization signals by using the information received in a cycle start communication 60. In a simple form, upon receiving a cycle start communication 60, the internal clock can be updated by the nominal cycle period plus the cycle start delay 110 carried within the cycle start communication 60. In other forms of update, the internal clock can compare and adjust its internal count of time to provide a gradual or modified synchronization with the time information carried in the cycle start communication 60. Where the start delay is encoded as a number of master clock periods, the receiving unit can bring its internal clock to within one master clock period of the reference time kept by the cycle master unit. Receiving units might use low cost implementations of an internal clock and rely on the cycle start signal to synchronize their operation to periodic reference point. If more accurate timing is desired, a receiving unit can use a use an averaging method such as a phase lock loop with a long time constant to average the synchronization periods, thereby approaching the accuracy provided by the cycle master unit. In this way, the synchronization signals are "self-correcting," since they carry a correction factor of the cycle start delay 110 within them.

In a further method according to this invention, a number of units 10 can be assigned sequential access numbers, and following the cycle start signal 60, each unit 10 with an assigned access number sequentially uses the interconnect 20. During this time of sequential assigned access communications 70, units without an assigned access number refrain from using the interconnect 20. This provides at least one opportunity for each of the units with assigned access numbers to access the interconnect 20 in the period between synchronization signals. This meets the requirements for moving fixed blocks of data a periodic intervals (isochronous data) such as digitized audio or video, or time-critical control information. At the completion of the sequential assigned access communications 70. the interconnect 20 is again available for general access by all units.

In a preferred implementation of a method sequential assigned access communications, all units 10 that do not have an assigned access number refrain from using the interconnect 20 from the cycle start communication 60, until the completion of a specified number of communications, or until the appearance of a long gap or idle signal appropriate to the media. These other communications will be the assigned access communications 70 of the units that do have an assigned access number.

In a simple implementation, units with assigned access numbers will use the interconnect 20 in the order of their assigned access numbers; unit 1 sending the first communication after the cycle start, unit 2 sending the second, etc. Access numbers can be physically set for each unit, or the access numbers can be dynamically assigned in the course of communications with the cycle master unit and other units. In a preferred form, the gap between assigned access communications 70 will be shorter than the gap before a regular demand-driven transaction communication 80 can start.

To recognize the passing of communications on the interconnect 20, a unit 10 can look at the characteristics of the gaps between communications on the interconnect 20. This gap or "interchannel" gap can be shorter when between assigned access communications 70, than for the "inter-transaction" gap between regular demand-driven transaction communications 80, so that the unit can determine whether to refrain from using the interconnect 20. This allows a simple implementation in which a unit need only wait for the return of longer "inter-transaction" gaps rather than having to count the number of assigned access communications 70 as they occur. In a preferred form, assigned access communications 70 are preceded and followed by an "interchannel" gap 72 of a particular size characteristic, for example, greater than 1.0 but less than or equal to 1.5 microseconds.

An assigned access communication 70 would have a synchronization filed and a data field. The sync field can serve to synchronize the receiving detector and to indicate the existence of following data. The data field optionally carries data to be sent during the assigned access communication 70.

FIG. 3 shows a schematic representation of an apparatus for communicating a synchronization signal over an communications interconnect in accordance with this invention. An apparatus for providing the self-correcting synchronization signal in accordance with this invention includes a cycle master unit 120 and a receiving unit 130 connected by a communications interconnect 20. Within the cycle master unit 120 are a master cycle timer 140, a packet transmit circuit 150 and a media access control circuit 160. The master cycle timer 140 records the passage of time and generates a cycle sync point 90 at predetermined intervals of the nominal cycle period 100. The current timer contents 170 are transferred to the packet transmit circuit 150 for sending as a cycle start signal 60 on the interconnect 20. Access to the interconnect 20 to send cycle start signal 60 is controlled by media access control circuit 160.

At receiving unit 130 the interconnect 20 is connected to a packet receiver circuit 200 which extracts the timing information from the cycle start signal 60 and provides this information as new timer contents 210 to a local cycle timer 220 within the receiving unit 130. This cycle timer 220 can be divided by a divider 230 to provide a local cycle synch signal 240 for synchronizing the operation of other circuits (not shown) within receiving unit 130.

These and other embodiments can be practiced without departing from the true scope and spirit of the invention, which is defined by the following claims.

What is claimed is:

1. A method of providing a self-correcting synchronization signal on a communication interconnect which connects multiple units, said method comprising the steps of:
    waiting a predetermined period of time (nominal cycle period);
    after said predetermined period of time, waiting a further period of time for the absence of communications on said interconnect among any of said units, and forming a count of the passage of time during this further period of time (start delay);
    forming a synchronization signal including said count of said further period of time; and
    sending said synchronization signal on said interconnect.

2. A method of providing a self-correcting synchronization signal as in claim 1 further comprising:
    receiving said synchronization signal at a receiving one of said units; and
    updating said receiving units count of time by said predetermined period of time plus said count of said further period of time.

3. A method of providing a self-correcting synchronization signal as in claim 1 further comprising:
    assigning sequential access numbers to a predetermined number of units;
    upon receiving a synchronization signal on said interconnect, units not assigned an access number refraining from using said interconnect until all units assigned an access number have sequentially used said interconnect.

4. A method of providing a self-correcting synchronization signal as in claim 1 further comprising:
    including in said synchronization signal a count of said predetermined period of time.

5. A method of providing a self-correcting synchronization signal on a multiple-access communication interconnect which interconnects a cycle master unit and multiple cycle slave units, said method comprising the steps of:
    counting in a master counter in said cycle master unit the passage of time to a next multiple of a predetermined nominal cycle period;
    at said next multiple, starting a start delay time counter in said cycle master unit, counting the passage of time until a synchronization signal can be sent;
    monitoring said interconnect by said cycle master unit until the absence of communications on said interconnect among any of said cycle master or cycle slave units;
    forming in said cycle master unit a synchronization signal containing the counts of said master counter and of said start delay time counter; and
    sending said synchronization signal by said cycle master unit on said interconnect.

6. A method of providing a self-correcting synchronization signal as in claim 5 further comprising:
    receiving said synchronization signal on said interconnect by one of said cycle slave units; and
    synchronizing an internal clock counter in said cycle slave unit to the time of receiving said synchronization signal plus said start delay time count of said synchronization signal.

7. A method of providing a self-correcting synchronization signal as in claim 5 further comprising:
    assigning an access number to a predetermined number of said cycle slave units by said cycle master unit;
    for all cycle slave units not assigned a said access number, refraining from initiating a communication on said interconnect from the time of receiving a said synchronization signal until all cycle slave units assigned a said access number have sequentially used said interconnect.

8. An apparatus for providing a self-correcting synchronization signal on a multiple-access communication interconnect which interconnects a cycle master unit and multiple cycle slave units, said apparatus comprising:

within said cycle master unit
- a master cycle timer for recording the passage of time and generating a cycle sync point at predetermined intervals of time;
- a packet transmit circuit connected to said master cycle timer for receiving the current timer contents of said master cycle timer and generating a cycle start signal for transmission on said interconnect;
- a media access control circuit connected to said packet transmit circuit and said interconnect for control of access of said packet transmit circuit to said interconnect;

and within said receiving unit
- a packet receiver circuit connected to said interconnect for extracting a timing information from said cycle start signal; and
- a cycle timer connected to said packet receiver circuit for receiving said extracted timing information and producing a local cycle sync signal for use within said receiving unit.

* * * * *